(12) United States Patent
Murat

(10) Patent No.: US 10,663,174 B2
(45) Date of Patent: May 26, 2020

(54) INSULATION DEVICE

(71) Applicant: OMERIN DIVISION SILISOL, Saint Etienne (FR)

(72) Inventor: Frédéric Murat, Saint Maurice de Lignon (FR)

(73) Assignee: OMERIN DIVISION SILISOL, Saint Etienne (FR)

( * ) Notice: Subject to any disclaimer, the term of this patent is extended or adjusted under 35 U.S.C. 154(b) by 497 days.

(21) Appl. No.: 15/353,300

(22) Filed: Nov. 16, 2016

(65) Prior Publication Data
US 2017/0138609 A1    May 18, 2017

(30) Foreign Application Priority Data

Nov. 17, 2015   (FR) ...................................... 15 61062

(51) Int. Cl.
*F24C 15/02*    (2006.01)
*B23P 19/00*    (2006.01)

(52) U.S. Cl.
CPC ............ *F24C 15/021* (2013.01); *B23P 19/00* (2013.01)

(58) Field of Classification Search
USPC .......................................................... 126/1 F
See application file for complete search history.

(56) References Cited

U.S. PATENT DOCUMENTS

| 505,703 | A | * | 9/1893 | Dodge | ..................... F16J 15/32 277/631 |
| 4,495,659 | A | * | 1/1985 | Madnick | .............. A41D 13/081 2/66 |
| 4,893,357 | A | * | 1/1990 | Evans | .................. A41D 13/081 2/208 |
| 6,412,343 | B1 | * | 7/2002 | Jefferson | ................. G01P 5/165 73/182 |

(Continued)

FOREIGN PATENT DOCUMENTS

| CN | 104957198 A |   | 10/2015 |
| DE | 2742813 | * | 4/1979 |

(Continued)

OTHER PUBLICATIONS

Machine translations of DE2742813 Claims and Specificaiton.*
(Continued)

*Primary Examiner* — Steven B McAllister
*Assistant Examiner* — John E Bargero
(74) *Attorney, Agent, or Firm* — Cantor Colburn LLP

(57) ABSTRACT

An insulation device having: a tubular and pliable joint member, the joint member comprising a first end region and a second end region opposite to the first end region, the second end region being fastened to the first end region at a junction area so as to form a joint loop, and
a flexible sleeve comprising a tubular central portion, a first end portion and a second end portion disposed on either side of the tubular central portion, the first end portion being folded toward the interior of the tubular (Continued)

central portion, the second end portion being folded toward the interior of the tubular central portion, the flexible sleeve being mounted about the joint loop and configured to cover the junction area.

The present invention also concerns a folding tool and a method for folding and mounting the insulation device.

3 Claims, 3 Drawing Sheets

(56) References Cited

U.S. PATENT DOCUMENTS

| | | | | |
|---|---|---|---|---|
| 6,962,339 | B1 * | 11/2005 | Spurgeon | F16J 15/36 277/358 |
| 7,025,359 | B2 * | 4/2006 | Flasher | F16J 15/065 277/631 |
| 8,479,541 | B1 * | 7/2013 | Baily | D04B 3/02 66/117 |
| 2003/0001344 | A1 * | 1/2003 | Bono, Jr. | F16J 15/061 277/631 |
| 2003/0216770 | A1 * | 11/2003 | Persidsky | A61B 17/3423 606/191 |
| 2004/0026874 | A1 * | 2/2004 | Flasher | F16J 15/065 277/628 |

FOREIGN PATENT DOCUMENTS

| | | | |
|---|---|---|---|
| EP | 3114739 B1 * | 12/2018 | H02G 1/081 |
| FR | 2819303 A1 | 7/2002 | |

OTHER PUBLICATIONS

English Machine Translation to Abstract of CN104957198.
English Machine Translation to Abstract of FR2819303.
French Search Report for FR1561062.

* cited by examiner

INSULATION DEVICE

The present invention concerns an insulation device intended to be used in the field of heating members, in particular to ensure the thermal insulation at the leaf of a furnace. According to other aspects, the invention also concerns a folding tool, intended to the folding back of the ends of a flexible sleeve, and a method for folding back the flexible sleeve and mounting the insulation device comprising said flexible sleeve.

Currently, the furnaces available on the market are increasingly proposing a pyrolytic automatic cleaning device. This pyrolysis program is carried out by a temperature rise of the interior of the furnace until reaching a temperature close to 500° C. Also, the counterpart to this pyrolytic cleaning is that the opening of the furnace, generally designed by a vitreous leaf and accessible by the user, is very hot. It is therefore necessary, in order to avoid the burns, to insulate at most the peripheral contour of the opening of the furnace, as well as the leaf itself by an interior insulation device which will also be effective to reduce the heat losses during the pyrolysis.

The existing insulation devices can comprise braided glass fiber which is a good thermal insulator, compatible with the cooking of food but which does not withstand the welding. However, the braided glass fiber materials tend to fray on the sharp edges when they are subjected to friction, in particular when wiping their surface with a sponge or a cloth.

Thus, one of the aims of the present invention consists in overcoming at least one of these disadvantages. For this purpose, the present invention proposes an insulation device intended to thermally and internally insulate the joint between a heating member and its opening, the insulation device comprising:

- a tubular and pliable joint member, the joint member comprising a first end region and a second end region opposite to the first end region, the second end region being fastened to the first end region at a junction area so as to form a joint loop, and
- a flexible sleeve comprising a tubular central portion, a first end portion and a second end portion disposed on either side of the tubular central portion, the first end portion being folded toward the interior of the tubular central portion, the second end portion being folded toward the interior of the of the tubular central portion,
- the flexible sleeve being mounted about the joint loop and configured to cover the junction area.

Thus, the flexible sleeve obtained is folded at its two end portions so that the sharp edges are no longer accessible. Consequently, the sharp edges are no longer frayed, and the braid remains in good condition. Wiping the folded portions of the sleeve with a sponge or other utensil does not result in a fraying, the flexible glass fibers are bent toward the interior of the tubular central portion of the sleeve with the whole braid.

Furthermore, the interior bending of the first and second end regions of the sleeve forms a material over-thickness which contributes to provide a slight compression of the sleeve on the joint loop so that the positioning of the folded sleeve on the junction area is more stable than without folding.

In the present document, it is meant by the verb 'to fold' and its derivative terms (for example 'fold back') a step of bending an end portion of a tube-shaped element, here for example, a tubular braid of an insulating material comprising glass fibers, toward the interior of the tube in the direction of its central portion, so that the sharp edge of the end portion is no longer visible or in direct contact with the outside of the tube.

Typically, the first end portion of the flexible sleeve is folded back toward the interior of the tubular central portion in the direction of the second end portion.

Conversely, the second end portion of the flexible sleeve is folded back toward the interior of the tubular central portion in the direction of the first end portion.

Advantageously, the joint member and the sleeve are each formed at least in part of a braided material so as to provide flexibility and pliability to the insulation device which can thus be slightly compressed when mounted in a furnace or on the door of a furnace. This also allows a facilitated conformation of the insulation device as a function of the desired final geometry and in particular a very good adaptability to the shape of the contour of the leaf.

Preferably, the braided material incorporates glass fibers which is a very good slight insulator which complies with the legislation relative to the food security.

According to a disposition, the joint member further comprises a metal mesh so as to give a globally tubular shape to the joint member as well as an adapted mechanical resistance.

Preferably, the second end region is fastened to the first end region of the joint member via at least one staple. This type of fastener avoids a welding step which would be destructive of the glass fibers, it withstands the target temperatures and has the advantage of being simple and quick to implement. This type of fastener also allows to avoid creating a bead of material compared with a fastening mode requiring a covering of material and allows to preserve a tubular-shaped hollow joint member in all parts of the joint loop.

According to a second aspect, the invention concerns a folding tool extending according to a longitudinal direction and intended to fold at least one end portion of a tubular element, such as a flexible sleeve, the folding tool comprising:

- a gripping portion, and
- a folding portion secured to the the gripping portion and comprising a free end part whose surface has a globally convergent shape, the folding portion being configured to bend at least one end portion toward the interior of said tubular element.

This tool thus allows the effective folding of a flexible sleeve intended to cover a junction area of a joint loop, as previously described.

According to a disposition, the free end part of the folding portion has globaly a truncated-cone shape so as to facilitate the implementation of the folding.

Preferably, the diameter of the folding tool is slightly smaller than that of the flexible sleeve so as to authorize the sliding of the folding tool in said tubular element or flexible sleeve whose at least one end portion is folded. This is in particular advantageous for the manipulation of the flexible sleeve that it will be necessary to introduce about the joint member.

Advantageously, the gripping portion comprises at least a first tubular end part and a second end part secured to the folding portion. This first tubular end part lightens the tool and authorizes the introduction of a first end region of the joint member in its hollow part in order to facilitate the sliding of a sleeve initially mounted about the folding tool, on the joint member.

Preferably, the gripping portion and the folding portion are composed of two assembled metal parts. These metal parts provide a mechanical strength to the tool and facilitate the folding of the glass fibers of the flexible sleeve as well as the sliding of the latter on the joint member. Indeed, the hardness of the metal tool allows to bend the braid of glass fibers more easily than if the tool was made of a deformable plastic material.

According to a third aspect, the present invention concerns a method for folding a flexible sleeve intended to form an insulation device as previously described, the method comprises the steps of:
  a) providing the flexible sleeve comprising a tubular central portion, a first end portion and a second end portion,
  b) folding the first end portion toward the interior of the tubular central portion of the flexible sleeve via the free end part of the folding portion of the folding tool as previously described,
  c) folding the second end portion toward the interior of the tubular central portion so as to obtain a folded sleeve, and
  d) sliding the folded sleeve about the folding tool so as to provide a folded sleeve ready to be mounted on a joint member as previously described.

Thus, this method allows a very simple implementation of a folded sleeve intended to cover a junction area of the joint loop as previously described.

According to still another aspect, the invention proposes a method for mounting an insulation device as previously described, the mounting method comprising the steps of:
  e) providing the folded sleeve about the folding tool as previously described,
  f) providing the tubular joint member,
  g) introducing the first end region of the joint member inside the first tubular end part of the gripping portion of the folding tool as previously described,
  h) sliding the folded sleeve about the joint member,
  i) removing the first end region of the joint member from the first tubular end part of the folding tool,
  j) fastening the first end region to the second end region of the joint member so as to form the joint loop, and
  k) sliding the flexible sleeve on the joint loop until covering the junction area.

This very simple method uses a folding tool having advantageously two functions: that of folding the flexible sleeve and that of allowing the sliding of the sleeve on the junction loop, despite the over-thickness due to the bending of the braid on itself.

Preferably, the step j) comprises a step of stapling the first end region to the second end region.

Other aspects, aims and advantages of the present invention will better appear upon reading the following description of an embodiment thereof, given as a non-restrictive example and made with reference to the annexed drawings. The figures do not necessarily comply with the scale of all the shown elements so as to improve their readability. In the following description, for the sake of simplification, identical, similar or equivalent elements of the different embodiments carry the same numerical references.

Figure 1:
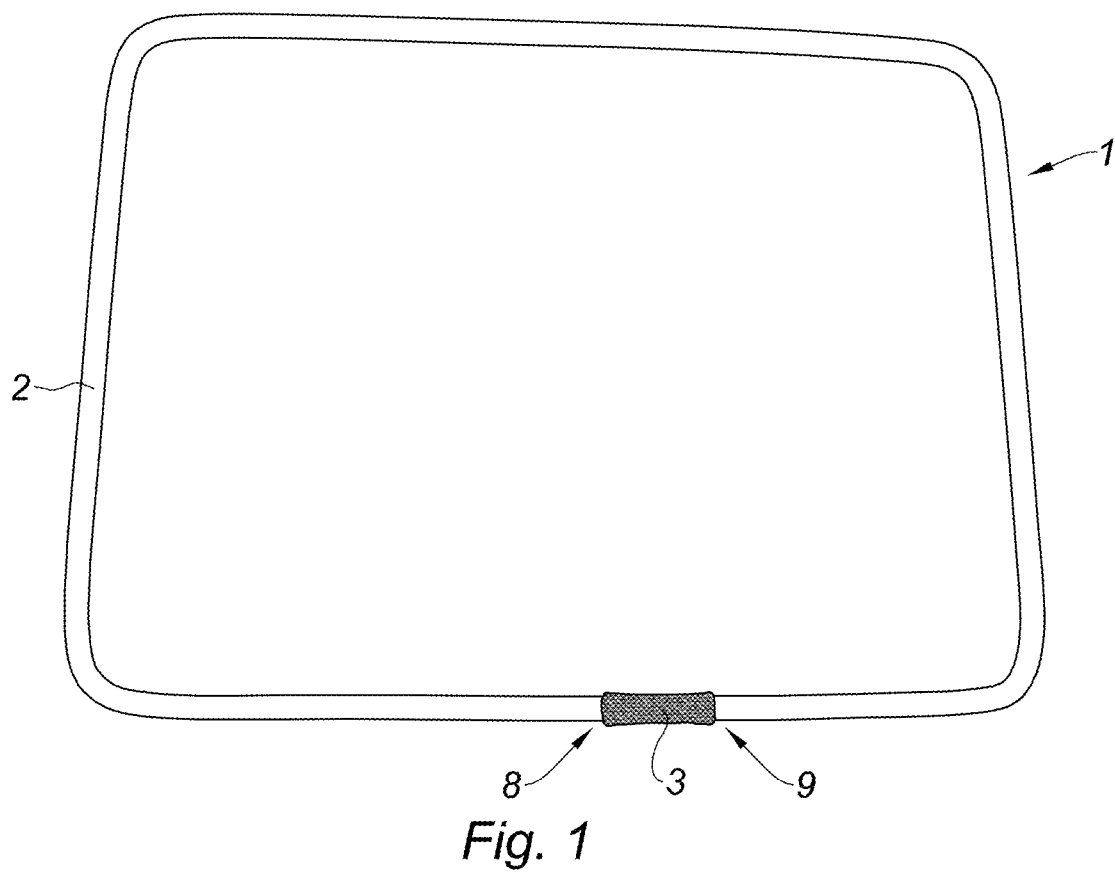
FIG. 1 shows a schematic view of an insulation device according to an embodiment of the present invention.
Figure 2:
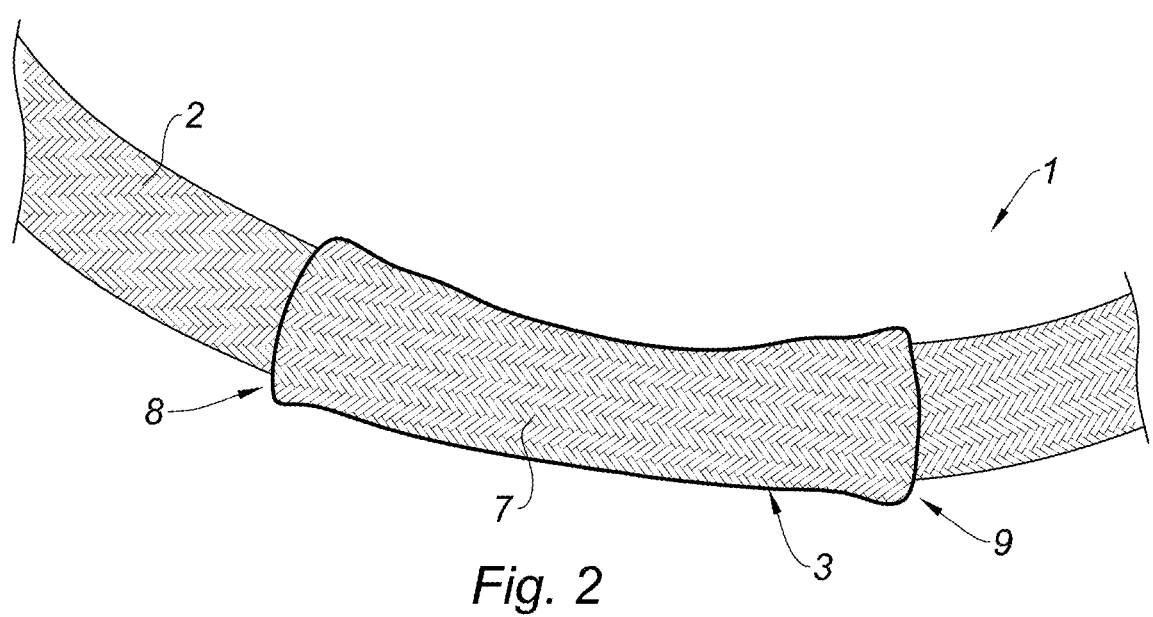
FIG. 2 illustrates an enlarged view of the insulation device according to the embodiment of FIG. 1.
Figure 8:
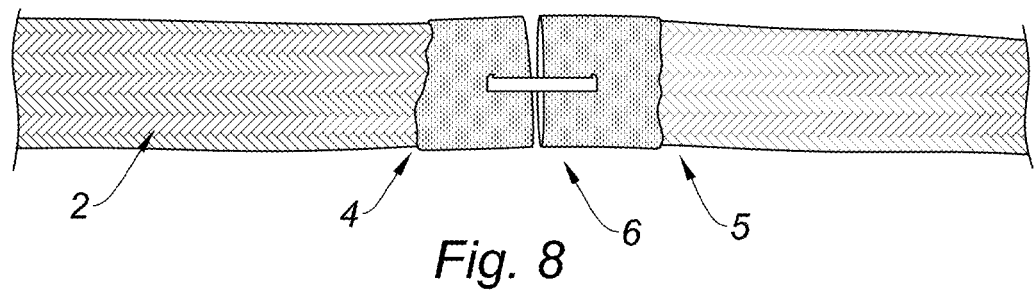
FIG. 8 illustrates a fastening mode of the end regions of a joint member according to an embodiment of the present invention.

FIG. 1 illustrates an insulation device 1 comprising a pliable tubular joint member 2 forming a joint loop on which is mounted a folded flexible sleeve 3 (enlargement in FIG. 2). The joint member 2 and the sleeve 3 are formed at least in part of a braided material incorporating glass fibers so as to give very good thermal insulation properties to the insulation device 1. As illustrated in FIG. 8, the joint member 2 comprises a first end region 4 fastened to a second opposite end region 5 by a staple so as to form the joint loop intended to be clipped, for example, inside a furnace so as to insulate the opening. The junction area 6 between the stapled first end region 4 and the second end region 5, which can lead to a thermal bridge, it is covered by the insulating sleeve 3, as illustrated in FIGS. 1 and 2.

Figure 3:
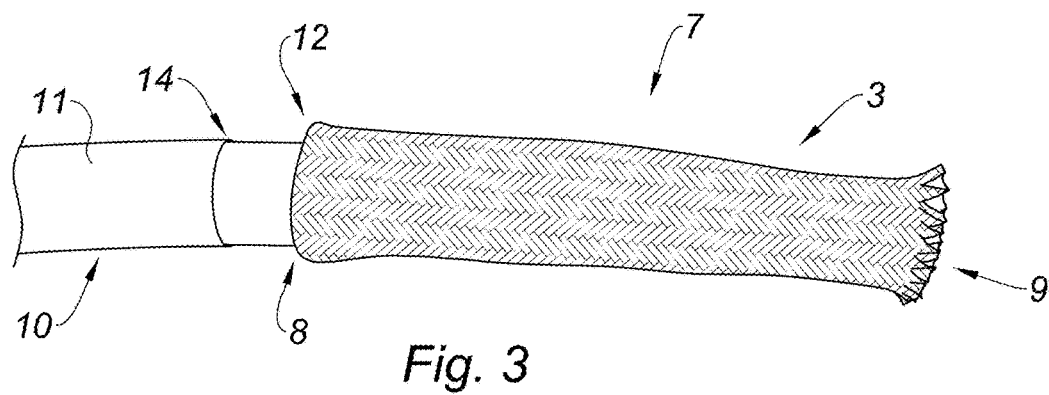
FIG. 3 illustrates a step of folding a flexible sleeve according to an embodiment of the present invention.

The flexible sleeve 3 comprises a tubular central portion 7, a first end portion 8 and a second end portion 9 located on the opposite side of the tubular central portion 7. As illustrated in FIG. 3, when the end portion 8, 9 is not folded, the braid tends to fray, which can be amplified upon friction which may take place during the use of the insulation device 1, in particular in a furnace.

Figure 5:
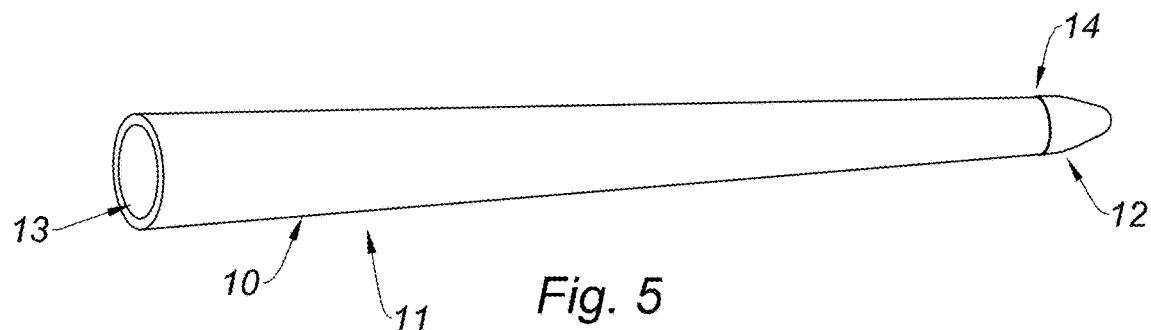
FIG. 5 illustrates the folding tool according to an embodiment of the present invention.

A folding tool 10, fully illustrated in FIG. 5, is then used in order to fold or in other words, bend the first end portion 8 and the second end portion 9 toward the interior of the tubular central portion 7 of the flexible sleeve 3 according to the folding method of the present invention. The folding tool 10 comprises two secured metal parts which extend along a longitudinal direction. These two metal parts define a gripping portion 11 and a folding portion 12, the latter being secured to the gripping portion 11.

Figure 4:
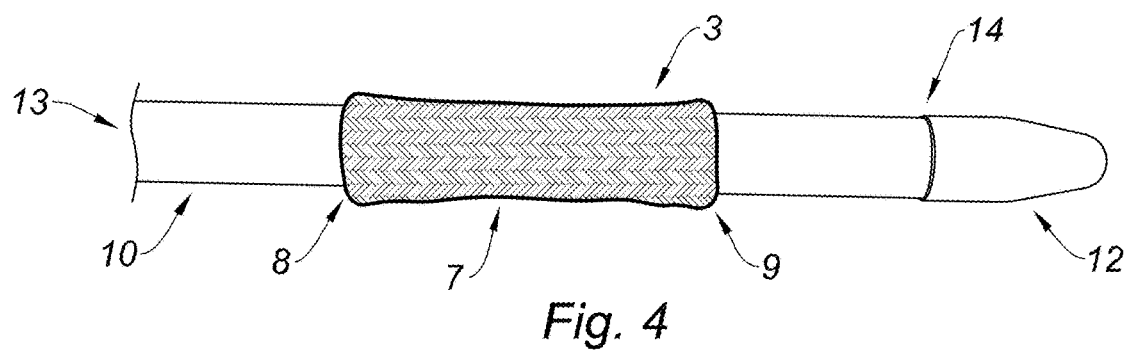
FIG. 4 illustrates a folded sleeve on a folding tool according to an embodiment of the present invention.

As illustrated in FIG. 4, the folding portion 12 comprises a free end part whose surface has a globally convergent shape which can be assimilated to a globally truncated-cone shape. This folding portion 12 allows to fold effectively the first end portion 8 of the flexible sleeve 3 inside the tubular central portion 7, in the direction of the second end portion 9 (FIG. 3—step b) of the folding method. Thus, the sharp edge of this first end portion 8 is bent on itself toward the interior of the tube formed by the central portion 7 so that it is no longer subject to friction. Once the first end portion 8 is folded, the folding tool 10 is then used to fold the second end portion 9 (step c) and the sleeve 3 thus folded and ready to be used on a junction area 6. The folded sleeve 3 is then slid about the folding tool 10 (FIG. 4, step d).

Figure 6:
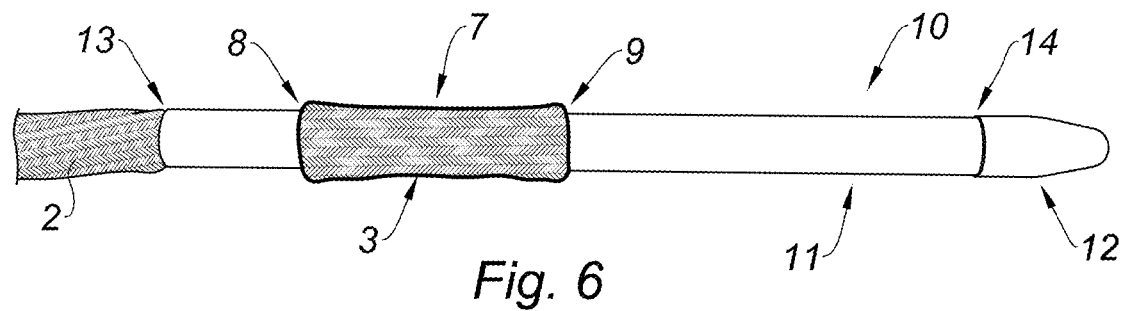
FIGS. 6 and 7 illustrate steps of method relative to the sliding of a folded sleeve on a joint member according to an embodiment of the present invention.
Figure 7:
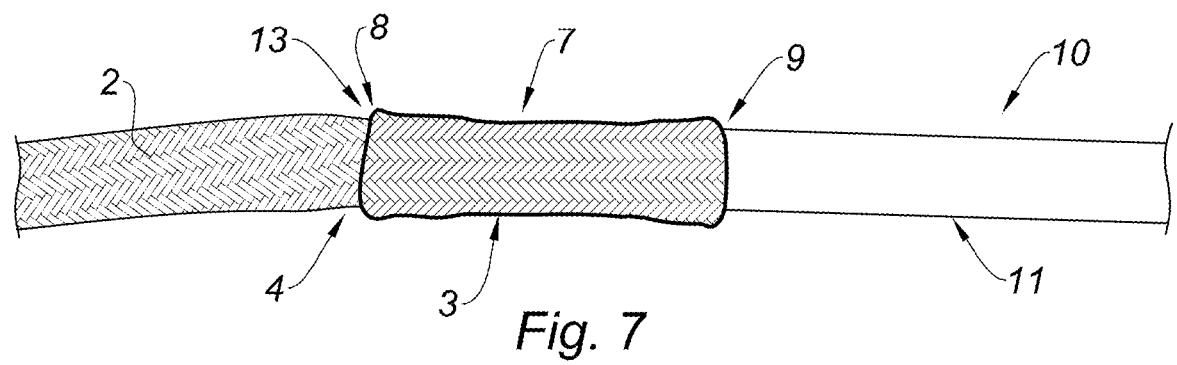

As illustrated in FIG. 5, the gripping portion 11 of the folding tool 10 comprises a first tubular end part 13 on the opposite side to a second end part 14 secured to the folding portion 12. This first tubular end part 13 is used according to step g) of the insulation device 1 mounting method for the introduction of a first end region 4 of the joint member 2 (FIG. 6). Then, according to step h) of the method, the sleeve 3 folded and mounted about the folding tool 10 is slid on the joint member 2 (FIG. 7). After removal of the first end region 4 of the folding tool 10, the latter is fastened by a staple (step j—FIG. 8) to the second end region 5 in order to form the junction area 6 and the joint loop 2. Finally, the folded sleeve 3 is slid until reaching the junction area 6 so as to form the insulation device 1 of the invention (FIGS. 1 and 2).

Thus, the present invention proposes an insulation device 1 for insulating the opening of a heating member whose components are simple to manufacture and to mount, the mounting of this device 1 furthermore requires the use of only one and the same folding tool 10.

It goes without saying that the invention is not limited to the embodiments described above by way of examples but that it comprises all the technical equivalents and variants of the described means as well as their combinations.

The invention claimed is:

1. A method for providing an insulation device, comprising:
   providing a tubular and pliable joint member, the joint member comprising a first end region and a second end region opposite the first end region;
   fastening the second end region to the first end region at a junction area to form a joint loop of the joint member;
   locating a flexible sleeve at the junction area, the flexible sleeve comprising a tubular central portion, a first end portion and a second end portion disposed on either side of the tubular central portion, the flexible sleeve being covering the junction area when the flexible sleeve is mounted about the junction area of the joint loop, wherein the locating step comprising the steps of:
   folding the first end portion into an interior of the tubular central portion of the flexible sleeve via a free end part of a folding portion of a folding tool, the folding tool further comprising: a gripping portion, and the folding portion is secured to the gripping portion and comprises the free end part whose surface has a globally convergent shape, the folding portion being configured to bend the first end into the interior of the tubular central portion of the sleeve; folding the second end portion into the interior of the tubular central portion of the flexible sleeve so as to obtain a folded sleeve, and
   sliding the folded sleeve about the folding tool in order to locate the folded sleeve at the junction area of the joint member, wherein the insulation device is a furnace insulation device.

2. The method as in claim 1, wherein the locating step further comprises:
   providing the folded sleeve about the folding tool,
   introducing the first end region of the joint member inside the first tubular end part of the gripping portion of the folding tool,
   sliding the folded sleeve about the joint member,
   removing the first end region of the joint member from the first tubular end part of the folding tool,
   fastening the first end region to the second end region of the joint member so as to form the joint loop, and
   sliding the flexible sleeve on the joint loop until covering the junction area.

3. The method of claim 2 wherein the fastening step comprises a step of stapling the first end region to the second end region.

* * * * *